Figure 1:
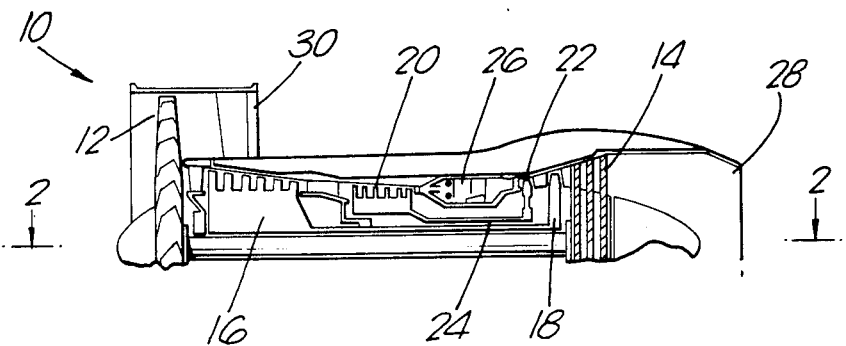

United States Patent [19]

Pask et al.

[11] Patent Number: 4,716,721
[45] Date of Patent: Jan. 5, 1988

[54] IMPROVEMENTS IN OR RELATING TO GAS TURBINE ENGINES

[75] Inventors: George Pask; Peter A. Shaw, both of Derby, England

[73] Assignee: Rolls-Royce plc, London, England

[21] Appl. No.: 797,805

[22] Filed: Nov. 13, 1985

[30] Foreign Application Priority Data

Dec. 8, 1984 [GB] United Kingdom ................. 8431059

[51] Int. Cl.⁴ ........................... F02C 7/20; F02G 3/00
[52] U.S. Cl. ................. 60/39.32; 415/199.4; 415/219 R
[58] Field of Search ................. 60/226.1, 262, 39.36, 60/39.161, 39.75, 39.32, 39.31; 415/189, 190, 199.4, 199.5, 219 R

[56] References Cited

U.S. PATENT DOCUMENTS

| | | | |
|---|---|---|---|
| 3,620,012 | 11/1971 | Wilde | 60/39.36 |
| 3,775,975 | 12/1973 | Stenger et al. | 60/39.32 |
| 3,861,139 | 1/1975 | Jones | 60/226.1 |
| 3,908,361 | 9/1975 | Gardiner | 60/39.32 |
| 4,271,666 | 6/1981 | Hurley et al. | 60/226.1 |
| 4,397,471 | 8/1983 | Feldman et al. | 415/115 |
| 4,502,276 | 3/1985 | Pask | 60/39.32 |

Primary Examiner—Louis J. Casaregola
Assistant Examiner—Donald E. Stout
Attorney, Agent, or Firm—Cushman, Darby & Cushman

[57] ABSTRACT

The casings of gas turbine engines are subject to loadings which distort the casing and adversely affect the running clearance between rotating and static components contained within the casings. The invention provides an engine having inner and outer housings the inner housing containing one of the engine compressors. The inner casing is mounted on a load transmitting and isolating structure which allows thrust and torque to be transmitted to the outer casing, but isolates the inner casing from distortions of the outer casing. The load transmitting and isolating structure includes a torque reaction and mounting means at the upstream end of the inner casing, a mounting means and a thrust reacting means mounted between the ends of the inner casing. The mounting means are adjacent the bearings of the rotor shaft of the compressor and are not affected to any appreciable extent by outer casing distortion. The thrust reacting means are mounted in a horizontal plane and are not affected by bending of the outer casing in a vertical plane.

12 Claims, 12 Drawing Figures

IMPROVEMENTS IN OR RELATING TO GAS TURBINE ENGINES

This invention relates to gas turbine engines, and is particularly concerned with reducing the effects of engine casing distortion on the clearance between the rotating and static engine components, such as the blades and the various seals. In aircraft engines which are mounted from the aircraft wings by means of pylons, the reaction to the engine thrust is offset, and the resulting bending moment causes engine bending and casing distortion.

It is important that these clearances are kept to as small a value as possible. Variations in clearance can lead to engine inefficiency and loss of performance in the case of an increase in the clearances, and rubbing between the rotating and static components in the case of a reduction in the clearances.

During the engine design stage considerable emphasis is placed on keeping deviations from a nominal rotor clearance to a minimum for the reasons outlined above.

It is obvious that clearance variations due to casing distortion can be avoided if the casing is mounted concentrically within the main engine carcase, and supported adjacent the shaft bearings. The clearance between the rotating and static components can be preserved by keeping the static components, eg., the casings, circular, and by keeping the casing concentric with the shaft carrying the rotating components, eg., blades and seal elements.

Large diameter casings can be maintained circular by means of spoked structures at each end of the casing. Therefore, the inner case has to be mounted at its front and rear ends as near to these spoked structures as possible. Circumferential temperature gradients have to be avoided, although axial gradients are acceptable. In order to maintain concentricity between casing and shaft, the ends of the inner casing have to be located as near to the transverse planes through the shaft bearings as possible. The problem then arises of mounting the internal casing so that it can transmit torque and axial load to the outer casing without incurring the distortions that are present in the outer casing, as a result of the method of mounting the engine.

The present invention seeks to provide a gas turbine engine having inner and outer casings mounted with respect to one another such that the loads induced on the inner casing can be transferred to the outer casing, and that any distortion of the outer casing has a minimal effect on the inner casing.

Accordingly the present invention provides a gas turbine engine having a main engine carcase or outer casing, an inner casing containing at least in part an arrangement of stator vanes and rotor blades, the stator vanes being attached to the inner casing, and the rotor blades attached to a shaft mounted in bearings, the inner casing being mounted within the outer casing by means of a load transmitting and isolating structure, the isolating structure including a mounting means at each end of the inner casing locating the inner and outer casings concentrically with one another at or adjacent plane of the shaft bearings, and allowing relative axial movement with one another, torque reacting means located between the inner and outer casings to allow torque induced on the inner casing to be transmitted to the outer casing, and thrust reacting means positioned between the ends of the inner casing to allow thrust induced on the inner casing to be transmitted to the outer casing.

The mounting means at the ends of the inner casing may comprise cylindrical sleeves attached to the outer casing and cylindrical surfaces on the inner casing, the cylindrical surfaces on the inner casing engaging the inner surfaces of the sleeves of the outer casing.

Torque can be transmitted from the inner to the outer casing at any point along the casing length, for example through dogs on the casings located in a vertical plane containing the engine axis of rotation. Any bending of the outer casing results in sliding on the dog faces, but with little or not distortion being transmitted to the inner casing.

Alternatively, the torque reacting means can be located at either end of the casing, as close to the plane of the shaft location bearing as possible, where no relative radial movement takes place between the inner and outer casing. In such an arrangement, the sliding dogs can be dispensed with and the mounting means and the torque reacting means can be integrated. For example, the cylindrical sleeve on the outer casing at the front end can be replaced by a ring of dowels which are concentric with, and are in the plane of the shaft front location bearing. The dowels engage corresponding openings in a ring attached to the inner casing.

The inner casing may contain a compressor of the engine, and the mounting means at each end of the compressor are preferably adjacent the bearings of the compressor rotor.

Figure 3:
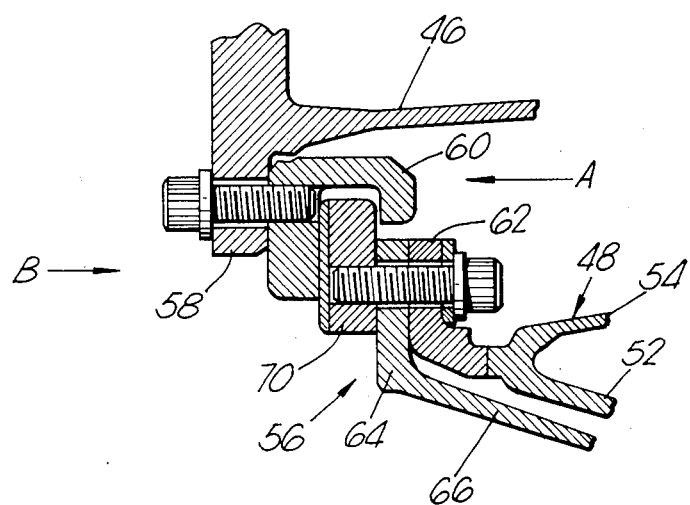
Figure 2:
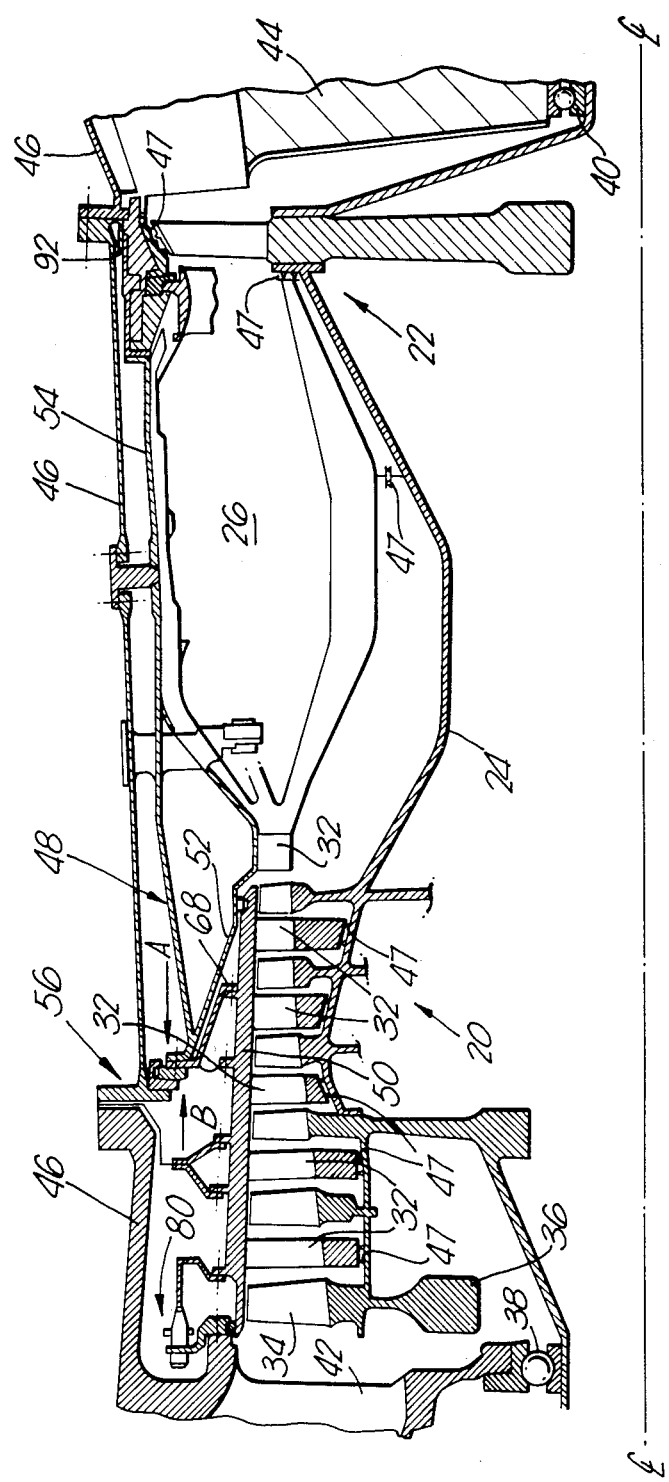
Figure 6:
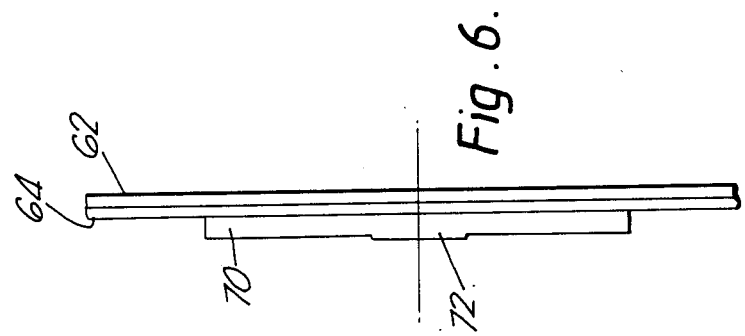
Figure 5:
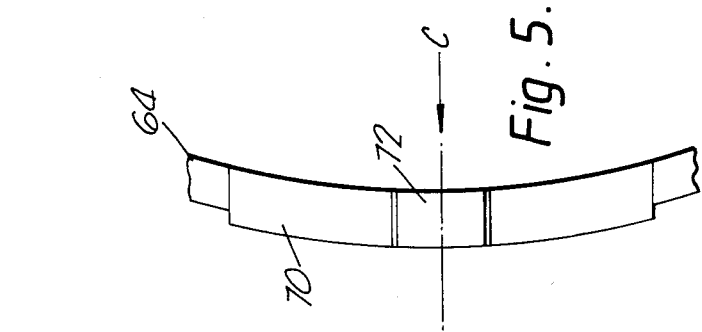
Figure 4:
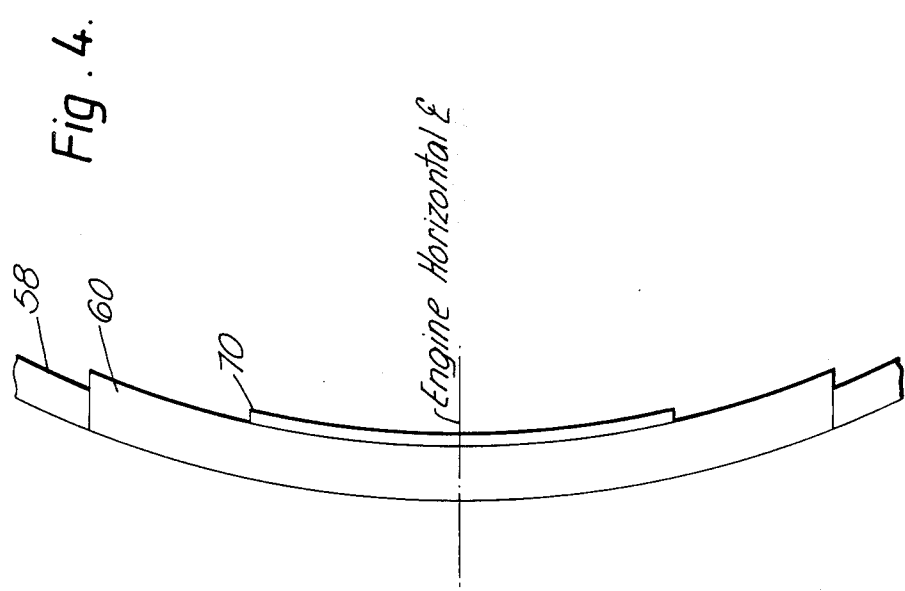
Figure 7:
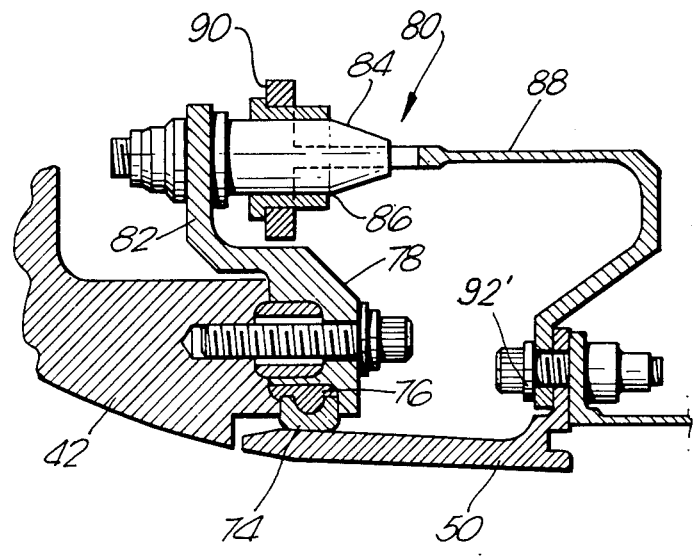
Figure 8:
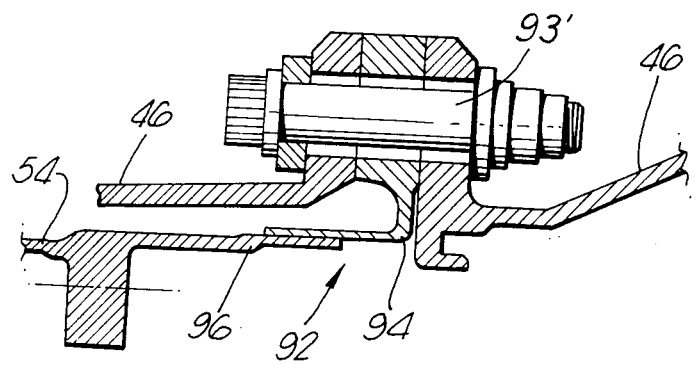
Figure 9:
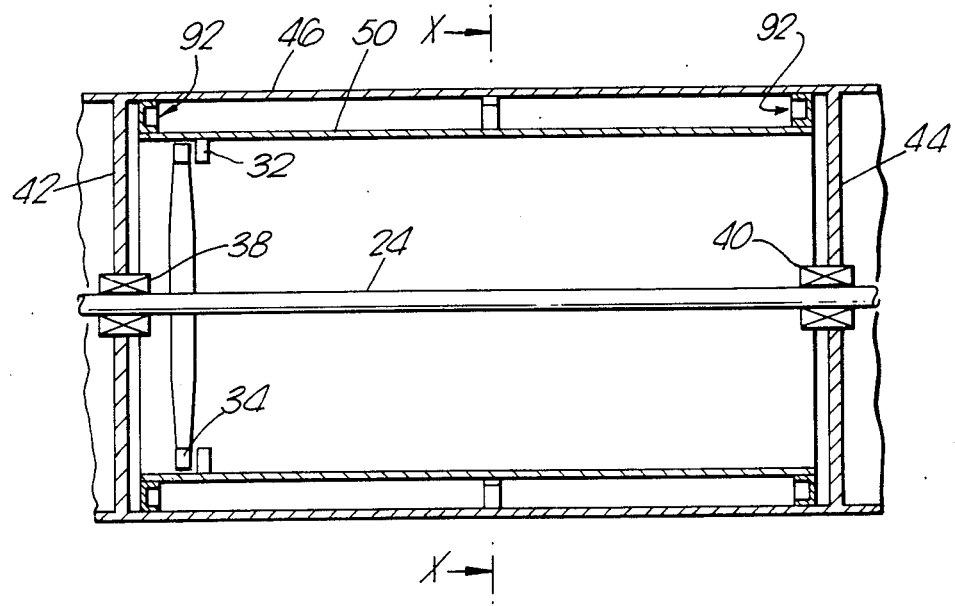
Figure 10:
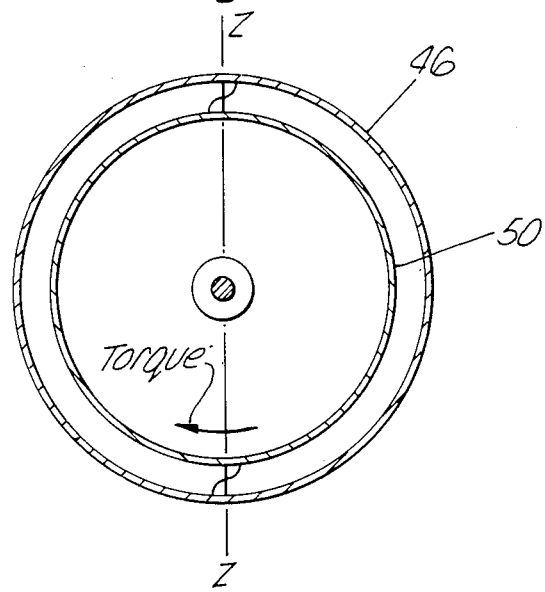
Figure 11:
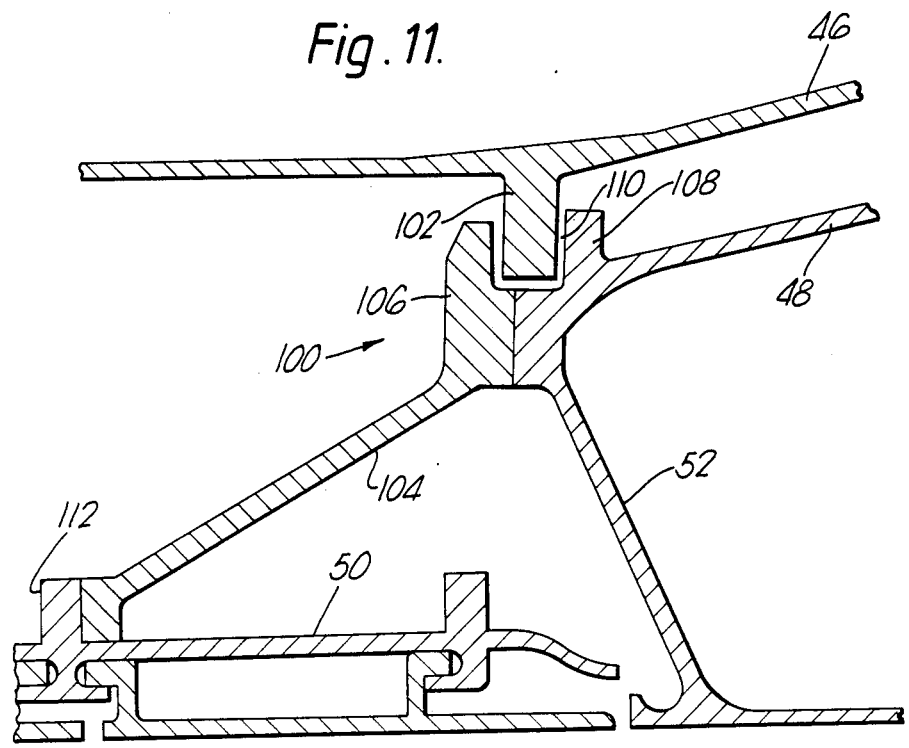
Figure 12:
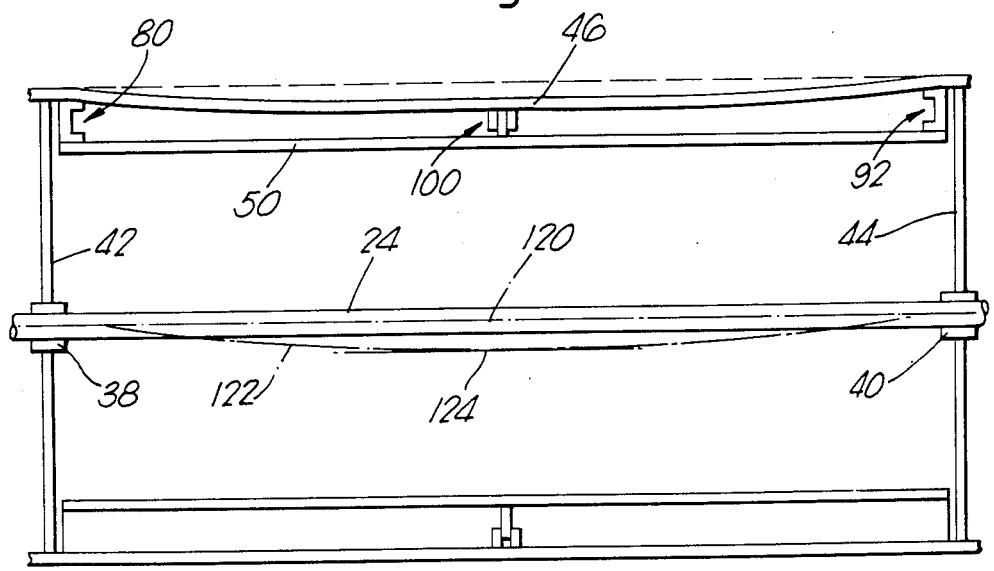

The present invention will now be more particularly described with reference to the accompanying drawings in which:

FIG. 1 is a diagramatic half-section of a front fan, high by pass ratio gas turbine engine to which the present invention has been applied, FIG. 2 is a part section on line 2—2 of the engine shown in FIG. 1, FIG. 3 is a detail to a larger scale of the engine shown in FIG. 2 showing the thrust reacting means of the load transmitting and isolating structure, FIG. 4 is a view on arrow A in FIG. 2, FIG. 5 is a view on arrow B in FIG. 2, FIG. 6 is a view on arrow C in FIG. 5, FIG. 7 is a detail to a larger scale of the engine shown in FIG. 2 illustrating the torque reacting means and upstream mounting means of the load transmitting and isolating structure, FIG. 8 is a detail to a larger scale of the engine shown in FIG. 2 illustrating the downstream mounting means of the load transmitting and isolating structure, FIG. 9 shows in side elevation, an inner and outer casing of a gas turbine engine in diagramatic form, having a modified form of torque reacting means, and FIG. 10 is section on line x—x in FIG. 9, FIG. 11 shows an alternative thrust reacting means of the load transmitting and isolating structure, FIG. 12 shows in side elevation, an inner and outer casing of a gas turbine engine in diagrammatic form having an alternative form of thrust reacting means.

Referring to the drawings, a gas turbine engine 10 has a fan 12 driven by a low pressure turbine 14, an intermediate pressure compressor 16 driven by an intermediate pressure turbine 18, a high pressure compressor 20 driven by a high pressure turbine 22, through a shaft 24, and an annular combustor 26. The engine operates in a conventional manner, the products of combustion driving the turbines and exhausting through a nozzle 28, and the fan delivery air exhausting through an annular outlet 30.

From FIG. 2 it will be seen more clearly that the high pressure compressor 20 comprises six stages of stator vanes 32 and rotor blades 34. The rotor blades are connected to discs 36 which in turn are secured to the shaft 24. The high pressure turbine 22 which is a single stage turbine is also attached to the shaft 24 which is mounted in an upstream bearing 38 and a downstream bearing 40.

The bearings 38 and 40 are secured in radial structures 42 and 44 which extend to and are attached to an outer engine casing or carcase 46.

The engine is provided with gas seals 47 between the rotating and static components of the engine. These seals may prevent leakage of compressed air between the compressor stages, between the shaft 24 and an outer casing of the combustor 26, or between the turbine 22 and the downstream end of the combustor.

The engine 10 has an inner casing 48 which has an upstream cylindrical portion 50 to which a majority of the stator vanes 32 are attached. The most downstream row of vanes are attached adjacent a downstream extension 52 of the inner casing which also has a further downstream extension 54 extending to the region of the high pressure turbine 22. Although not shown here in detail, the casing portion 50 is made up of a number of ring like members, bolted together. Alternate ones of these ring each carry a row of the stator vanes, whilst the remaining rings define the interior surface of the casing in the region of the rotor blades 34. It is the clearance between the tips of the rotor blades and the casing, and the clearance between the rotating and static parts of the engine seals with which the present invention is concerned.

The inner casing is supported within the outer casing by a gas load transmitting and distortion isolating structure. This structure which has a number of component parts at various axial, radial and circumferential locations in relation to the two casings allows gas loads exerted on the inner casing to be transmitted to the outer casing, but prevents the resulting distortions of the outer casing from being transferred to the inner casing. This structure includes a thrust reacting means preferentially located between the ends of the inner casing, and shown in more detail in FIGS. 3 to 6. In these figures the same reference numerals have been used to indicate the same components in FIGS. 1 and 2. In FIG. 3 a thrust reacting means 56 is mounted on the inner and outer casings, the outer casing 46 has an annular flange 58 to which are bolted two channel section thrust plates 60. As will be seen from FIG. 4 the centre of each thrust plate 60 (only the left hand plate is shown) is disposed on the horizontal centre line of the engine.

The inner casing includes a common flange 62 to which are secured the inner casing portions 52, 54, a flange 64 of an annular locating cone 66 which is secured to the inner casing portion 50 at 68, and two thrust pads 70. The thrust pads are located within the respective channel section thrust plates 60, and as will be seen from FIGS. 5 and 6, the thrust pads are also located on the engine horizontal centre line. Each thrust pad 70 has an arcuate contact surface 72 of large diameter (FIG. 6) so that when contact takes place between the thrust pads and thrust plates 60, there is a line rather than a face contact.

At each end of the inner casing, the inner casing is mounted so as to be concentric with the outer casing, and to allow relative axial movement with respect to the outer casing. Referring to FIG. 7, the upstream end of the inner casing 50 engages an annular seal 74 which is located in a slot 76. The slot 76 is defined partly by an annular flange 78 which forms part of the torque reacting means 80, and partly by the radial structure 42 which is attached to the outer casing 46.

The torque reacting means 80 also serves to centre the upstream end of the inner casing portion 50 with respect to the axis of rotation of the shaft 24. The annular flange 78 is integral with a further outboard annular flange 82 which together form a front support panel.

A plurality of axially extending support pins 84 are equi-spaced around the circumference of the flange 82, and are attached to the flange 82. Each pin 84 engages an aperture 86 in an annular location ring 88 via a bush 90. The location ring 88 is attached by bolts 92 to flanges on the inner casing portion 50, and the location ring is free to move axially on the support pins 84. Thus tie support pins and the locating ring support the inner casing at the upstream end concentrically with the shaft 40, allow the inner casing to move axially, and allow torque to be transmitted from the inner to the outer casing.

The inner casing 48 is supported at the downstream end of the downstream extension by the mounting means 92. The mounting means 92 comprises a rear location ring 94 attached to the outer casing 46, and a skirt 96 of the inner casing which is a sliding fit in the ring 94. The combination of ring and skirt centres the downstream end of the inner casing with repect to the shaft 24 and also provides an air seal.

When the engine 10 is operating, air is compressed in the compressor 20 and flows into the annular combustor 26 which also receives a flow of fuel. The products of combustion flow through nozzle quide vanes and drive the high pressure turbine 22, and hence to the lower pressure turbines 18, 14. The rotation of the turbine 22 causes rotation of the shaft 24 and the discs and blades 36, 34 of the compressor 20.

The internal loads induced on the inner casing by the engine operation comprise a thrust in the forward direction and a torque, the direction of which can be clockwise or anti-clockwise depending on the direction of rotation of the compressor.

The thrust loads are transmitted from the inner to the outer casing by the two thrust pads 70 located on the transverse engine centre line and attached to the inner casing, the thrust pads abutting the respective thrust plates 60 attached to the outer casing.

The torque is transmitted by the location ring 88 attached to the inner casing portion to the support pins 84 attached to the outer casing. As has been mentioned this structure also centres the upstream end of the inner casing with respect to the shaft 24, and keeps the inner casing 46 circular.

During operation of the engine in an aircraft flight cycle, the outer casing 46 is also subjected to bending movements which cause bend distortion of the casing. If bending occurs it is contained in the vertical plane through the engine centre line and movement of the outer casing is not transmitted to the innercasing by the thrust reacting means 56 because the thrust pads 70 are mounted on the horizontal engine centre line, and no movement is seen at these points which can be transmitted to the inner casing 48. Since the bending takes place between the bearing support structures 42, 44, the outer casing does not distort to any appreciable extent in the region of the mounting means 80 and 92. Thus the inner casing 48, particularly the inner casing portion 50 remains circular and concentric with shaft 24, ensuring that the clearance between the tips of the blades 34 and the inner surface of the casing remains as small as possible throughout the range of engine operations. The engine gas seals also preserve their concentricities and clearances.

If distortion on the outer casing 46 could be transmitted to the inner casing 48, then the clearances between the rotating and static components of the compressor would have to be large enough to allow for the distortion of the inner casing, in order to avoid contact between, for example, the blades 34 and the inner surface of the casing.

During some parts of the engine operation, these clearance would be excessive, reducing compressor efficiency, adversely affecting surge and stall margins, and increasing fuel consumption.

FIGS. 9 and 10 show in diagramatic form only, a compressor and outer casing of a gas turbine engine incorporating the present invention in which the torque reacting means is of a different arrangement to that shown in FIGS. 1 and 7. Also, for the sake of clarity, the arrangement for reacting thrust has been omitted. Similar components and assemblies have been given the same references as the corresponding components and assemblies in the previous figures.

In this arrangement, the compressor casing 50 is supported concentrically within the outer casing 46 by the mounting means 92 at both the upstream and downstream ends of the casing. The torque reacting means comprise a pair of projections located at the top and bottom of the casings and the contact surfaces between respective ones of the projections lie in a vertical plane z—z which also contains the engine axis of rotation when the outer casing bends, shown exaggerated in FIG. 9 the centre of the outer casing will move in the plane z—z and the faces of the projections will slide over one another, but little or no distortion will be transmitted to the inner casing.

An alternative thrust reacting means located between the ends of the inner casing is shown in more detail in FIG. 11. The thrust reacting means 100 is mounted on the inner and outer casings, the outer casing 46 has an annular flange 102 which extends radially inwards.

The flange 102 extends radially inwardly into an annular slot 110 formed axially between a flange 108 which extends radially outwardly from the inner casing 48, and a flange 106 which extends radially outwardly from a conical member 104. The conical member 104 is secured at its upstream end to the inner casing portion 50 at 112, and at its downstream end the flange 106 is secured to the inner casing portion 52.

The flange 102 is slidably located in the slot 110 and thrust is transmitted to the flange 102 and outer casing from the flanges 106 and 108 of the inner casing, and because the flange 102 is slidably located in the slot relative radial movement between the inner and outer casings is allowed.

The ideal axial position for the thrust reacting means 100 is where the slope of the outer casing, when bending due to the effect of engine thrust, is parallel with the inner casing centre line, i.e. the engine centre line. At this position the relative movement between the inner and outer casings is in a vertical plane only and can be accommodated by radial sliding only, as can be seen in FIG. 12 which shows the thrust reacting means 100 and exagerated bending of the outer casing on the upper half of the diagram.

In FIG. 12 the inner casing centre line, and engine centre line, is denoted by numeral 120, and the outer casing centre line is denoted by numeral 122 when bending due to the engine thrust. At the axial position denoted by numeral 124 the slope of the outer casing and centre line 122 is parallel with the inner casing centre line 120.

The flange 102 and slot 110 need not be positioned in the ideal position, which is generally at the axial mid point of the engine, but may in practise be positioned over a wide axial length generally about the mid-point of the engine where the slope of the outer casing is substantially parallel to the inner casing centre line.

The flanges need not be completely annular but could be of a circumferentially discontinuous nature, but it is preferably to have annular flanges so that the thrust loads may be taken fully circumferentially at the engine axial mid point.

It would be possible to have a single flange on the inner casing slidably mounted in a slot in the outer casing.

We claim:

1. A gas turbine engine having an outer casing, and an inner casing containing at least in part an arrangement of stator vanes and rotor blades, the stator vanes being attached to the inner casing, and the rotor blades attached to a shaft mounted in bearings, the inner casing being mounted within the outer casing by means of load transmitting and isolating structure including a mounting means adjacent each end of the inner casing, the mounting means locating the inner and outer casings concentrically with one another and allowing relative axial movement with one another, said mounting means comprising torque reacting means located between the inner and outer casings to allow torque to be transmitted to the outer casing, and thrust reacting means positioned between the ends of the inner casing to allow thrust induced on the inner casing to be transmitted to the outer casing with the load-transmitting and isolating structure minimizing the transmission of loads from the outer casing to the inner casing, said mounting means at at least one end of the inner casing comprising a cylindrical sleeve attached to the outer casing and a cylindrical surface of the inner casing engaging with the sleeve of the outer casing, allowing relative axial movement between the inner and outer casings.

2. An engine as claimed in claim 1 in which the inner casing mounting means are each located adjacent a respective one of the bearings of the shaft.

3. An engine as claimed in claim 1 in which the torque reacting means comprises an apertured ring attached to the inner casing, and a plurality of support pins attached to the outer casing, each said pin engaging in a corresponding aperture in the apertured ring.

4. An engine as claimed in claim 1 in which said torque reacting means is located at the upstream end of the inner casing.

5. An engine as claimed in claim 1 in which the torque reacting means comprise a pair of projections on the outer casing engaging with a corresponding pair of projections on the inner casing, the contact surfaces between respective ones of said projections being contained in a vertical plane containing the axis of rotation of the engine.

6. An engine as claimed in claim 1 in which the thrust reacting means is located in a vertical plane, the vertical plane being in an axial position where the slope of the outer casing when bending due to the effect of engine thrust, is substantially parallel to the engine longitudinal axis.

7. An engine as claimed in claim 6 in which the thrust reacting means comprises a radially inwardly extending flange attached to the outer casing and slidably mounted to the inner casing to transmit thrust to the outer casing, relative radial movement of the outer and inner casings being accommodated by radial sliding of the inner casing and flange.

8. An engine as claimed in claim 7 in which the flange is slidably mounted in a slot formed between two axially spaced flanges on the inner casing.

9. An engine as claimed in claim 6 in which the thrust reacting means comprises a radially outwardly extending flange attached to the inner casing and slidably mounted to the outer casing to transmit thrust to the outer casing, relative radial movement of the outer and inner casings being accommodated by radial sliding of the outer casing and flange.

10. An engine as claimed in claim 9 in which the flange is slidably mounted in a slot formed between two axially spaced flanges on the outer casing.

11. An engine as claimed in claim 1 in which the stator vanes and compressor blades comprise the high pressure compressor of the engine.

12. A gas turbine engine having an outer casing, and an inner casing containing at least in part an arrangement of stator vanes and rotor blades, the stator vanes being attached to the inner casing, and the rotor blades attached to a shaft mounted in bearings, the inner casing being mounted within the outer casing by means of load-transmitting and isolating structure including a mounting means adjacent each end of the inner casing, the mounting means locating the inner and outer casings concentrically with one another and allowing relative axial movement with one another, said mounting means comprising torque reacting means located between the inner and outer casings to allow torque to be transmitted to the outer casing, and thrust reacting means positioned between the ends of the inner casing to allow thrust induced on the inner casing to be transmitted to the outer casing with the load transmitting and isolating structure minimizing the tranmission of loads from the outer casing to the inner casing, said thrust reacting means being located in a horizontal plane containing the engine longitudinal axis and said thrust reaction means comprising two thrust pads attached to the inner casing and located in a plane passing through the longitudinal axis of the engine, the pads being diametrically opposed to one another, and two thrust plates corresponding to the two said thrust pads attached to the outer casing, the thrust plates being disposed so as to be engaged by the respective ones of the thrust pads.

* * * * *